United States Patent
Fukaya et al.

(10) Patent No.: US 11,028,106 B2
(45) Date of Patent: Jun. 8, 2021

(54) METHOD FOR PRODUCING TETRAALKOXYSILANE

(71) Applicant: NATIONAL INSTITUTE OF ADVANCED INDUSTRIAL SCIENCE AND TECHNOLOGY, Tokyo (JP)

(72) Inventors: Norihisa Fukaya, Ibaraki (JP); Seong-Jib Choi, Ibaraki (JP); Jun-Chul Choi, Ibaraki (JP); Toshio Horikoshi, Ibaraki (JP); Sho Kataoka, Ibaraki (JP); Thuy Nguyen, Ibaraki (JP); Kazuhiko Sato, Ibaraki (JP); Minoru Hasegawa, Tokyo (JP); Hiroshi Kumai, Tokyo (JP)

(73) Assignee: NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 0 days.

(21) Appl. No.: 16/955,271

(22) PCT Filed: Dec. 25, 2018

(86) PCT No.: PCT/JP2018/047645
§ 371 (c)(1),
(2) Date: Jun. 18, 2020

(87) PCT Pub. No.: WO2019/131672
PCT Pub. Date: Jul. 4, 2019

(65) Prior Publication Data
US 2020/0347082 A1    Nov. 5, 2020

(30) Foreign Application Priority Data
Dec. 27, 2017  (JP) .............................. JP2017-252118

(51) Int. Cl.
C07F 7/04 (2006.01)
B01J 8/08 (2006.01)

(52) U.S. Cl.
CPC ............... C07F 7/04 (2013.01); B01J 8/082 (2013.01); B01J 2208/00017 (2013.01)

(58) Field of Classification Search
CPC ...................................................... C07F 7/04
See application file for complete search history.

(56) References Cited

U.S. PATENT DOCUMENTS

| | | | | |
|---|---|---|---|---|
| 2,473,260 A * | 6/1949 | Rochow | ................ | C07F 7/045 556/470 |
| 2,881,198 A | 4/1959 | Bailey | | |
| 4,211,717 A * | 7/1980 | Emblem | ................ | C07F 7/045 556/470 |
| 4,667,047 A * | 5/1987 | Imaki | .................... | C07F 7/045 556/469 |
| 4,752,647 A * | 6/1988 | Inaba | ...................... | C07F 7/04 556/470 |
| 6,288,257 B1 * | 9/2001 | Schattenmann | ........ | C07F 7/045 556/470 |
| 10,000,514 B2 * | 6/2018 | Fukaya | .................... | C07F 7/04 |
| 2002/0182128 A1 * | 12/2002 | Carnahan | ............ | B01J 19/0046 422/600 |
| 2003/0135062 A1 * | 7/2003 | Kurusu | .................... | C07F 7/04 556/483 |
| 2016/0002271 A1 * | 1/2016 | Yamashita | ............... | B01J 31/10 556/466 |
| 2017/0267701 A1 * | 9/2017 | Fukaya | .................... | C07F 7/04 |
| 2018/0327431 A1 * | 11/2018 | Chigondo | ............ | B01J 35/0006 |

FOREIGN PATENT DOCUMENTS

| EP | 1323722 A1 * | 7/2003 | ............... C07F 7/04 |
|---|---|---|---|
| JP | 33-1776 | 5/1955 | |
| JP | 62-114991 | 5/1987 | |
| JP | 3026371 | 1/2000 | |
| JP | 2001-114786 | 4/2001 | |
| JP | 2002-348292 | 12/2002 | |
| JP | 2003-252879 | 9/2003 | |
| JP | 2017-88498 | 5/2017 | |
| JP | 2017088498 A * | 5/2017 | |
| WO | 2015/170665 | 11/2015 | |
| WO | 2015/170666 | 11/2015 | |

OTHER PUBLICATIONS

English-Language Machine Translation of JP 2017088498 (2017) (Year: 2017).*
N. Fukaya et al., 45 Chemistry Letters, 828-830 (2016) (Year: 2016).*
N. Fukaya et al., 41 New Journal of Chemistry, 2224-2226 (2017) (Year: 2017).*
E. Suzuki et al., 2 Journal of the Chemical Society, Chemical Communications, 136-137 (1992) (Year: 1992).*
International Preliminary Report on Patentability dated Jun. 30, 2020 in International (PCT) Application PCT/JP2018/047645.
International Search Report (ISR) dated Mar. 12, 2019 in International (PCT) Application PCT/JP2018/047645.

* cited by examiner

*Primary Examiner* — Alexander R Pagano
(74) *Attorney, Agent, or Firm* — Wenderoth, Lind & Ponack, L.L.P.

(57) ABSTRACT

An object of the present invention is to provide a method capable of producing a tetraalkoxysilane with a high energy efficiency and with a high yield. The present invention provides a method for producing a tetraalkoxysilane, the method including: a first step of reacting an alcohol with a silicon oxide; and a second step of bringing a vaporized component of the reaction mixture obtained in the first step into contact with a molecular sieve.

19 Claims, 1 Drawing Sheet

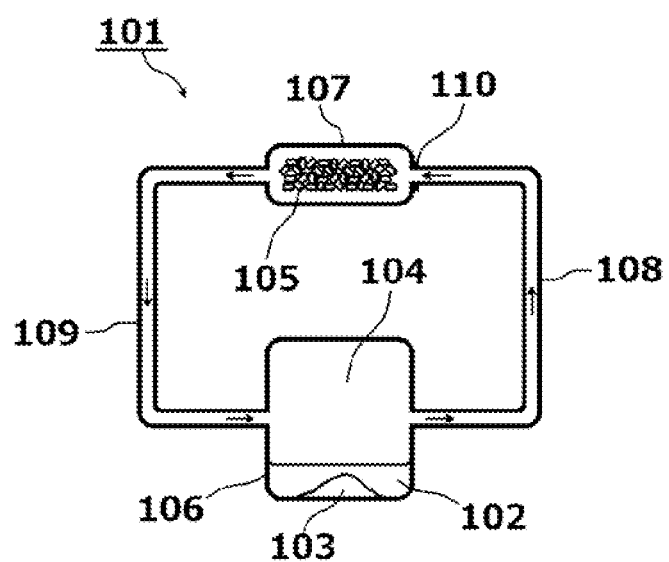

METHOD FOR PRODUCING TETRAALKOXYSILANE

TECHNICAL FIELD

The present invention relates to a method for producing a tetraalkoxysilane with a high efficiency. More particularly, the present invention relates to a method for producing a tetraalkoxysilane using a molecular sieve.

BACKGROUND ART

Tetraalkoxysilanes are used as raw materials for producing various types of silane compounds, organic silicone polymers, various types of silylating agents, colloidal silicas, ceramics and the like.

Examples of conventionally known methods for industrially producing alkoxysilanes include a method in which natural silicon dioxide as a raw material is mixed with carbon, followed by reduction at a high temperature to obtain a metal silicon, the resulting metal silicon is allowed to react with chlorine to obtain silicon tetrachloride, and the thus obtained silicon tetrachloride is used as a raw material and allowed to react with an alcohol (see Patent Document 1). A production method is also known in which a metal silicon is allowed to directly react with an alcohol (see Patent Document 2).

However, both of these methods need to include a process for producing a metal silicon, which requires a high temperature, and thus have problems that they are poor in energy efficiency.

On the other hand, as a method for directly producing an alkoxysilane from silica, a method is known in which silica is allowed to react with an alkyl carbonate, using an alkali metal element or an alkaline earth metal element as a catalyst, to produce an alkoxysilane (see Patent Documents 3 and 4). These methods are advantageous in terms of energy efficiently, since the above described metal silicon is not used as a raw material. At the same time, however, these methods require the use of an alkyl carbonate, which is a relatively expensive compound, in a stoichiometric molar amount at least twice that of silica, and thus are economically problematic as methods for industrially producing a tetraalkoxysilane.

The present inventors have found out that it is possible to produce a tetramethoxysilane using methanol and a silicon oxide as raw materials, and developed a method capable of producing a tetramethoxysilane with a high yield, by allowing methanol to react with a silicon oxide in the presence of carbon dioxide, and by removing water produced as a by-product using a molecular sieve (see Patent Document 5).

CITATION LIST

Patent Documents

Patent Document 1: JP 62-114991 A
Patent Document 2: U.S. Pat. No. 2,473,260
Patent Document 3: JP 2001-114786 A
Patent Document 4: JP 3026371 B
Patent Document 5: JP 2017-88498 A

SUMMARY OF INVENTION

Technical Problem

An object of the present invention is to provide a method capable of producing a tetraalkoxysilane with a high energy efficiency and with a high yield.

Solution to Problem

As a result of intensive studies to solve the above mentioned problems, the present inventors have found out that it is possible to produce a tetraalkoxysilane with a high yield, by connecting a reactor for allowing an alcohol to react with a silicon oxide, and a container for bringing a vaporized component of the resulting reaction mixture into contact with a molecular sieve, by an outward flow path and an inward flow path for allowing the vaporized component to move between the reactor and the container, and further by controlling the temperature of the reactor, the temperature of the outward flow path and the temperature of the container within respective specific ranges, thereby effectively removing water produced as a by-product. The present invention has been made based on the above described finding.

Specifically, the present invention is as follows.

<1> A method for producing a tetraalkoxysilane, the method including:

a first step of reacting an alcohol with a silicon oxide; and a second step of bringing a vaporized component of the reaction mixture obtained in the first step into contact with a molecular sieve;

wherein:

the first step is carried out in a reactor whose temperature ($T_1$) is controlled within the range of 200° C.<$T_1$<300° C.;

the second step is carried out in a container whose temperature ($T_1$) is controlled within the range of 10° C.≤$T_3$≤150° C., and which includes the molecular sieve provided therein;

the vaporized component moves from the reactor to the container through an outward flow path whose temperature ($T_2$) is controlled within the range of 190° C.≤$T_2$≤300° C.; and a component which has been brought into contact with the molecular sieve moves from the container to the reactor through an inward flow path.

<2> The method for producing a tetraalkoxysilane according to <1>, wherein the first step is carried out in the presence of an alkali metal compound and/or an alkaline earth metal compound.

<3> The method for producing a tetraalkoxysilane according to <2>, wherein the alkali metal compound is at least one selected from the group consisting of an alkali metal hydroxide, an alkali metal halide, an alkali metal carbonate and an alkali metal bicarbonate.

<4> The method for producing a tetraalkoxysilane according to any one of <1> to <3>, wherein the reaction mixture does not contain a compound for carrying out an azeotropic distillation.

Advantageous Effects of Invention

According to the present invention, it is possible to produce a tetraalkoxysilane with a high yield.

BRIEF DESCRIPTION OF THE DRAWING

The FIGURE is a schematic diagram showing an apparatus which can be used in a method for producing a tetraalkoxysilane, which is one embodiment of the present invention.

DESCRIPTION OF EMBODIMENTS

The present invention will now be described with reference to specific examples. It is noted, however, that the present invention is not limited to the description given below as long as the gist of the present invention is not deviated, and can be implemented with appropriate modifications.

<Method for Producing Tetraalkoxysilane>

The method for producing a tetraalkoxysilane (hereinafter, sometimes abbreviated as the "production method according to the present invention"), which is one embodiment of the present invention, is a method including: a first step of reacting an alcohol with a silicon oxide (hereinafter, sometimes abbreviated as the "first step"); and a second step of bringing a vaporized component of the reaction mixture obtained in the first step (hereinafter, sometimes abbreviated as the "vaporized component") into contact with a molecular sieve (hereinafter, sometimes abbreviated as the "second step"). This method is characterized in that: the first step is carried out in a reactor whose temperature ($T_1$) is controlled within the range of 200° C.<$T_1$<300° C. (hereinafter, sometimes abbreviated as the "reactor"); the second step is carried out in a container whose temperature ($T_3$) is controlled within the range of 10° C.≤$T_1$≤150° C., and which includes the molecular sieve provided therein (hereinafter, sometimes abbreviated as the "container"); the vaporized component moves from the reactor to the container through an outward flow path whose temperature ($T_2$) is controlled within the range of 190° C.≤$T_2$≤300° C.; and a component which has been brought into contact with the molecular sieve moves from the container to the reactor through an inward flow path.

The present inventors have found out that it is possible to produce a tetraalkoxysilane with a high yield, by connecting the reactor for reacting an alcohol with a silicon oxide (in the first step), and the container for bringing the vaporized component of the resulting reaction mixture into contact with a molecular sieve (in the second step), by the outward flow path and the inward flow path for allowing the vaporized component to move between the reactor and the container, and further by controlling the temperature ($T_1$) of the reactor, the temperature ($T_2$) of the outward flow path, and the temperature ($T_3$) of the container within the respective specific ranges described above.

The molecular sieve is used as a dehydrating agent for removing water produced as a by-product of the reaction between the alcohol and the silicon oxide. However, there are cases where the water may not be sufficiently removed depending on the dehydration conditions, possibly resulting in a decrease in the yield of the resulting tetraalkoxysilane, or the degradation of the molecular sieve. The present inventors have made it clear that, by controlling the temperature ($T_1$) of the reactor, the temperature ($T_2$) of the outward flow path and the temperature ($T_3$) of the container within the respective specific ranges described above, it is possible to improve the dehydrating action of the molecular sieve, the transport efficiency of the vaporized component and the like, as well as to reduce the degradation of the molecular sieve, as a result of which a tetraalkoxysilane can be produced efficiently and stably for a long period of time.

It is noted that the definition of the expression including the "first step" and the "second step" encompasses not only an embodiment in which the first step and the second step proceed separately, but also an embodiment in which the first step and the second step proceed simultaneously.

(First Step)

The first step is a step of reacting an alcohol with a silicon oxide. The type of the alcohol to be used is not particularly limited, and the alcohol can be selected as appropriate depending on the intended tetraalkoxysilane to be produced. For example, tetramethoxysilane can be produced by using methanol as the alcohol, and tetraethoxysilane can be produced by using ethanol as the alcohol.

The alcohol may be either an aliphatic alcohol or an aromatic alcohol, and the hydrocarbon group in the alcohol may have any of a branched structure, a cyclic structure, a carbon-carbon unsaturated bond and the like.

The number of carbon atoms in the alcohol is usually one or more, and preferably two or more, and at the same time, preferably 15 or less, more preferably 10 or less, and still more preferably 8 or less.

Specific examples of the alcohol include methanol, ethanol, 1-propanol, 2-propanol, 1-butanol, 2-butanol, 2-methyl-1-propanol, 2-methyl-2-propanol, benzyl alcohol and phenol. Among these, ethanol is preferred. In a method using a conventional metal silicon, the use of an alcohol containing a larger number of carbon atoms tends to result in a decrease in the yield of the resulting tetraalkoxysilane. However, the use of the production method according to the present invention enables to produce a tetraalkoxysilane with a high yield.

The amount of the alcohol to be used is usually one time or more, preferably five times or more, and more preferably 10 times or more, and at the same time, usually 10,000 times or less, preferably 5,000 times or less, and more preferably 3,000 times or less, with respect to the amount of substance of the silicon oxide used.

The first step is a step of reacting an alcohol with a silicon oxide, and the silicon oxide as used herein refers to a compound containing a silicon atom (Si) and an oxygen atom (O) as main constituent elements. In other words, the silicon oxide may be silicon monoxide (SiO), silicon dioxide ($SiO_2$), or a composite oxide with another metal, such as zeolite.

Specific examples of the silicon oxide include: natural minerals such as quartzite, silica sand, diatomaceous earth and quartz; fired ash of silicon-containing plants; volcanic ash; silicates; silica gels derived from silica sols; fumed silica; silica-alumina; and zeolites.

The first step is carried out in a reactor whose temperature ($T_1$) is controlled within the range of 200° C.<$T_1$<300° C. The temperature ($T_1$) is preferably 205° C. or higher, and more preferably 210° C. or higher. In the case of using ethanol as a raw material alcohol, the temperature ($T_1$) is still more preferably 240° C. or higher, and at the same time, the temperature ($T_1$) is preferably 280° C. or lower, and more preferably 260° C. or lower. When the temperature ($T_1$) is within the above described range, a tetraalkoxysilane can be produced with a higher yield.

The temperature ($T_1$) can be controlled by: heating the outer surface of the reactor using a heater or the like; circulating constant temperature water or constant temperature oil around the outer surface of the reactor; or the like.

The first step is preferably carried out in the presence of an alkali metal compound and/or an alkaline earth metal compound. When the first step is carried out in the presence of an alkali metal compound and/or an alkaline earth metal compound, the cleavage of a silicon-oxygen bond in the silicon oxide is facilitated, thereby enabling the production of a tetraalkoxysilane with a higher yield.

Examples of the alkali metal and the alkaline earth metal in the alkali metal compound and the alkaline earth metal compound include lithium (Li), sodium (Na), magnesium (Mg), potassium (K), calcium (Ca) and cesium (Cs). Examples of counter ions include hydroxides, halides, oxides, carbonates, bicarbonates, alkoxides, silicates, aluminates, phosphates, organic acid salts, sulfates and nitrates. Among these, hydroxides, halides, carbonates and bicarbonates are preferred, and alkali metal hydroxides, alkali metal halides, alkali metal carbonates and alkali metal bicarbonates are more preferred.

Specific examples of the alkali metal compound and the alkaline earth metal compound include lithium hydroxide, sodium hydroxide, potassium hydroxide, calcium hydroxide, cesium hydroxide, lithium carbonate, sodium carbonate, potassium carbonate, cesium carbonate, sodium fluoride, potassium fluoride and cesium fluoride. The alkali metal compound and the alkaline earth metal compound can be used not only one kind, but also in combination of two or more kinds thereof.

The total amount of the alkali metal compound and the alkaline earth metal compound is usually 0.0001 mol or more, and preferably 0.001 mol or more, and at the same time, usually 20 mol or less, and preferably 10 mol or less, with respect to 1 mol of the silicon oxide (in the case of silicon dioxide). When the total amount is within the above described range, a tetraalkoxysilane can be produced with a higher yield.

Reaction conditions other than the temperature ($T_1$) in the first step are not particularly limited, and can be selected as appropriate depending on the purpose.

The first step is carried out at a pressure (P) of usually 0.1 MPa or more, preferably 1.0 MPa or more, and more preferably 2.8 MPa or more, and at the same time, usually 60 MPa or less, preferably 30 MPa or less, and more preferably 20 MPa or less.

When the pressure (P) is within the above described range, a tetraalkoxysilane can be produced with a higher yield.

(Second Step)

The second step is a step of bringing a vaporized component of the reaction mixture obtained in the first step into contact with a molecular sieve. The molecular sieve is not particularly limited, and any material can be used as long as the material functions as a sieve of molecules, and shows a dehydrating action by absorbing water in its pores. Type A and Type X porous zeolites such as 3A, 4A, 5A and 13X can be preferably used. Among these, the molecular sieve is more preferably 3A and 4A, and particularly preferably 3A. When a 3A molecular sieve is used, it is possible to selectively remove water, and a tetraalkoxysilane can be produced with a higher yield.

The second step is carried out in a container whose temperature ($T_3$) is controlled within the range of 10° C.$\leq T_3 \leq$150° C., and which includes the molecular sieve provided therein. The temperature ($T_3$) is preferably 30° C. or higher, and more preferably 40° C. or higher, and at the same time, preferably 80° C. or lower, and more preferably 60° C. or lower. When the temperature ($T_3$) is within the above described range, a tetraalkoxysilane can be produced with a higher yield.

The temperature ($T_3$) can be controlled by: heating the outer surface of the container using a heater or the like; using the heat in the first step; circulating constant temperature water or constant temperature oil around the outer surface of the container; or the like.

The apparatus to be used in the production method according to the present invention may be, for example, the apparatus shown in the FIGURE. A specific description will be given below, with reference to the apparatus shown in the FIGURE.

An apparatus 101 shown in the FIGURE has a configuration including: a reactor 106 in which the first step is carried out; a container 107 which includes a molecular sieve 105 provided therein and in which the second step is carried out; an outward flow path 108 for allowing a vaporized component 104 to move from the reactor 106 to the container 107; and an inward flow path 109 for allowing a component which has been brought into contact with the molecular sieve 105 to move from the container 107 to the reactor 106. An alcohol 102, a silicon oxide 103, and an alkali metal compound and the like are introduced into the reactor 106, and the temperature ($T_1$) is controlled within the range of 200° C.$<T_1<$300° C. In this manner, the first step is carried out. The vaporized component 104 of the reaction mixture obtained in the first step is then introduced into the container 107 through the outward flow path 108, and a component which has been brought into contact with the molecular sieve 105 moves back to the reactor 106 through the inward flow path 109. The temperature ($T_3$) is controlled within the range of 10° C.$\leq T_1 \leq$150° C., and the vaporized component 104 is brought into contact with the molecular sieve 105 in the container 107. In this manner, the second step is carried out. Due to the difference between the temperature ($T_1$) and the temperature ($T_3$), and as a result of the temperature ($T_2$) of the outward flow path 108 being controlled within the range of 190° C.$\leq T_2 \leq$300° C., the vaporized component 104 moves efficiently from the reactor 106 to the container 107, and a component which has been brought into contact with the molecular sieve 105 moves efficiently from the container 107 to the reactor 106, without using a carrier gas, a compressor or the like, because of the difference in temperature and/or the difference in pressure within the reaction system.

The temperature ($T_2$) is preferably 200° C. or higher, and more preferably 210° C. or higher, and at the same time, preferably 290° C. or lower, and more preferably 280° C. or lower. When the temperature ($T_2$) is within the above described range, the vaporized component and the like can be moved more efficiently. The temperature ($T_2$) may be the same as the temperature ($T_1$), or may be a temperature higher or lower than the temperature ($T_1$). The temperature ($T_2$) is preferably within the range of ($T_1$)±50° C. and more preferably a within the range of ($T_1$)±35° C. From the viewpoint of improving the yield, the temperature ($T_2$) is preferably higher than the temperature ($T_1$). When the temperatures ($T_1$) and ($T_2$) are adjusted so as to be $T_2>T_1$, energy conservation and an improvement in the yield can be achieved, as a result of a decrease in the temperature ($T_1$).

The temperature ($T_2$) can be controlled by: heating the outer surface of the container using a heater or the like; using the heat in the first step; circulating constant temperature water or constant temperature oil around the outer surface of the container; or the like.

The temperature of the inward flow path is the same as the temperature ($T_3$), and is usually 10° C. or higher, preferably 40° C. or higher, and more preferably 60° C. or higher, and at the same time, usually 150° C. or lower, preferably 100° C. or lower, and more preferably 80° C. or lower.

The second step is a step of bringing the vaporized component of the reaction mixture obtained in the first step into contact with a molecular sieve, and the reaction mixture preferably does not contain a compound for carrying out an azeotropic distillation (hereinafter, sometimes abbreviated as "compound for azeotropic distillation") and the like. Since the reaction mixture containing an alcohol and water produced as a by-product can be an azeotropic mixture, the addition of a compound for azeotropic distillation, such as benzene or xylene, can also be considered. However, in the production method according to the present invention, it is possible to produce a tetraalkoxysilane with a high yield without using a compound for azeotropic distillation. Further, the use of a compound for azeotropic distillation may interfere with the purification of the resulting tetraalkoxysilane to a high-purity, and it is preferable that the reaction mixture do not contain a compound for azeotropic distillation.

EXAMPLES

The present invention will now be described more specifically with reference to Examples. However, the present invention can be modified as appropriate, as long as the gist of the present invention is not deviated. Accordingly, the scope of the present invention should not be construed as being limited by the specific examples described below.

Example 1

To the upper portion of a 200 mL autoclave (manufactured by Nitto Koatsu Co., Ltd.) made of SUS 316 and equipped with a mechanical stirrer, a tube made of SUS 316 and having an inner diameter of 4.6 mm, which tube is to be used as the outward flow path (corresponds to the portion indicated as 108 in the FIGURE) for allowing the vaporized component of the reaction mixture to move therethrough, and is configured to be able to be heated using a ribbon heater, as well as a tube made of SUS 316 and having an inner diameter of 4.6 mm, which tube is to be used as the inward flow path (corresponds to the portion indicated as 109 in the FIGURE) for allowing a component which has been brought into contact with the molecular sieve to move therethrough, were connected. The temperature ($T_2$) in the pipe of the outward flow path was maintained at 249° C. during the reaction. To these tubes, a 30 ml portable reactor (manufactured by Taiatsu Techno Corporation) made of SUS and containing 25 g of Molecular Sieve 3A (in the form of 2 mm beads, manufactured by Merck KGaA) was further connected. Constant temperature water was allowed to circulate around the exterior of the portable reactor, so that the temperature ($T_1$) of the molecular sieve portion inside the portable reactor was maintained at 53° C. A quantity of 0.9 g of a silicon dioxide (Wako gel 60N, from 63 to 212 μm; manufactured by Wako Pure Chemical Industries, Ltd.), 80 g of ethanol and 0.008 g of potassium hydroxide were introduced into the autoclave. Subsequently, an argon gas was fed from a gas cylinder at a temperature of 25° C., to fill the autoclave such that the pressure therein as indicated by a pressure meter (PGC-50M-MG10; manufactured by Swagelok Company) was 0.75 MPa. The autoclave was then maintained for 10 minutes while stirring, and sealed. Thereafter, the autoclave was heated to 240° C. ($T_1$) while stirring the interior of the autoclave at 500 rpm, and the reaction was allowed to proceed for six hours. The yield of the resulting tetraethoxysilane based on silica was 72.5%. The reaction results are shown in Table 1.

Example 2

A tetraethoxysilane was produced in the same manner as in Example 1, except that the temperature $T_2$ in the outward pipe was adjusted to 231° C. and the temperature $T_3$ of the molecular sieve portion was adjusted to 52° C., in the reaction conditions of Example 1. The yield of the resulting tetraethoxysilane based on silica was 72.2%. The reaction results are shown in Table 1.

Example 3

A tetraethoxysilane was produced in the same manner as in Example 1, except that the temperature $T_2$ in the outward pipe was adjusted to 209° C. and the temperature $T_3$ of the molecular sieve portion was adjusted to 58° C., in the reaction conditions of Example 1. The yield of the resulting tetraethoxysilane based on silica was 66.2%. The reaction results are shown in Table 1.

Example 4

A tetraethoxysilane was produced in the same manner as in Example 1, except that the reaction temperature $T_1$ was adjusted to 260° C., the temperature $T_2$ in the outward pipe was adjusted to 264° C., and the temperature $T_3$ of the molecular sieve portion was adjusted to 66.1° C., in the reaction conditions of Example 1. The yield of the resulting tetraethoxysilane based on silica was 78.6%. The reaction results are shown in Table 1.

Example 5

A tetraethoxysilane was produced in the same manner as in Example 1, except that the reaction temperature $T_1$ was adjusted to 280° C., the temperature $T_2$ in the outward pipe was adjusted to 284° C., and the temperature $T_3$ of the molecular sieve portion was adjusted to 57.4° C., in the reaction conditions of Example 1. The yield of the resulting tetraethoxysilane based on silica was 80.7%. The reaction results are shown in Table 1.

Example 6

A tetraalkoxysilane was produced in the same manner as in Example 1, except that 1.8 g of the silicon dioxide was used, 0.16 g of potassium hydroxide was used, and 90 g of Molecular Sieve 3A (filled into a 100 mL portable reactor made of SUS) was used, in the reaction conditions of Example 1. The yield of the resulting tetraethoxysilane based on silica was 79.1%. The reaction results are shown in Table 1.

Example 7

A tetraalkoxysilane was produced in the same manner as in Example 1, except that 1.8 g of the silicon dioxide was used, 0.16 g of potassium hydroxide was used, and 90 g of Molecular Sieve 4A (in the form of 2 mm beads, manufactured by Merck KGaA)(filled in a 100 mL portable reactor made of SUS) was used as the molecular sieve, in the reaction conditions of Example 1. The yield of the resulting tetraethoxysilane based on silica was 55.2%. The reaction results are shown in Table 1.

Example 8

A tetraalkoxysilane was produced in the same manner as in Example 1, except that 1.8 g of the silicon dioxide was used, 0.17 g of potassium fluoride, instead of potassium hydroxide, was used as the alkali metal compound to be added, and 90 g of Molecular Sieve 3A (filled into a 100 mL portable reactor made of SUS) was used, in the reaction conditions of Example 1. The yield of the resulting tetraethoxysilane based on silica was 91.7%. The reaction results are shown in Table 1.

Example 9

A tetraalkoxysilane was produced in the same manner as in Example 1, except that 1.8 g of the silicon dioxide was used, 0.21 g of potassium carbonate, instead of potassium hydroxide, was used as the alkali metal compound to be added, and 90 g of Molecular Sieve 3A (filled into a 100 mL portable reactor made of SUS) was used, in the reaction conditions of Example 1. The yield of the resulting tetraethoxysilane based on silica was 79.6%. The reaction results are shown in Table 1.

Example 10

A tetraalkoxysilane was produced in the same manner as in Example 1, except that 1.8 g of the silicon dioxide was used, 0.12 g of sodium hydroxide, instead of potassium hydroxide, was used as the alkali metal compound to be added, and 90 g of Molecular Sieve 3A (filled into a 100 mL portable reactor made of SUS) was used, in the reaction conditions of Example 1. The yield of the resulting tetraethoxysilane based on silica was 72.8%. The reaction results are shown in Table 1.

Example 11

A tetraalkoxysilane was produced in the same manner as in Example 1, except that 1.8 g of the silicon dioxide was used, 0.11 g of sodium carbonate, instead of potassium hydroxide, was used as the alkali metal compound to be added, and 90 g of Molecular Sieve 3A (filled into a 100 mL portable reactor made of SUS) was used, in the reaction conditions of Example 1. The yield of the resulting tetraethoxysilane based on silica was 79.4%. The reaction results are shown in Table 1.

Example 12

A tetraalkoxysilane was produced in the same manner as in Example 1, except that 1.8 g of the silicon dioxide was used, 0.49 g of cesium carbonate, instead of potassium hydroxide, was used as the alkali metal compound to be added, and 90 g of Molecular Sieve 3A (filled into a 100 mL portable reactor made of SUS) was used, in the reaction conditions of Example 1. The yield of the resulting tetraethoxysilane based on silica was 84.1%. The reaction results are shown in Table 1.

Example 13

A tetraalkoxysilane was produced in the same manner as in Example 1, except that 1.8 g of the silicon dioxide was used, 90 g of methanol was used as the alcohol to be used, 0.16 g of potassium hydroxide was used, 90 g of Molecular Sieve 3A (filled into a 100 mL portable reactor made of SUS) was used, the reaction temperature $T_1$ was adjusted to 230° C., the temperature $T_2$ in the outward pipe was adjusted to 240° C., and the temperature $T_3$ of the molecular sieve portion was adjusted to 60.0° C., in the reaction conditions of Example 1. The yield of the resulting tetramethoxysilane based on silica was 51.0%. The reaction results are shown in Table 1.

Example 14

A tetraalkoxysilane was produced in the same manner as in Example 1, except that 1.8 g of the silicon dioxide was used, 90 g of 1-propanol was used as the alcohol to be used, 0.16 g of potassium hydroxide was used, 90 g of Molecular Sieve 3A (filled into a 100 mL portable reactor made of SUS) was used, the reaction temperature $T_1$ was adjusted to 210° C., the temperature $T_2$ in the outward pipe was adjusted to 210° C., and the temperature $T_3$ of the molecular sieve portion was adjusted to 60.0° C., in the reaction conditions of Example 1. The yield of the resulting tetrapropoxysilane based on silica was 78.7%. The reaction results are shown in Table 1.

Reference Example 1

A tetraethoxysilane was produced in the same manner as in Example 1, except that the temperature $T_2$ in the outward pipe was adjusted to 246° C., 0 g of the molecular sieve was used, the temperature $T_3$ of the molecular sieve portion (internal temperature of the empty container) was adjusted to 65° C., in the reaction conditions of Example 1. The yield of the resulting tetraethoxysilane based on silica was 20.6%. The reaction results are shown in Table 1.

Comparative Example 1

A tetraethoxysilane was produced in the same manner as in Example 1, except that the temperature $T_2$ in the outward pipe was adjusted to 187° C. and the temperature $T_3$ of the molecular sieve portion was adjusted to 37° C., in the reaction conditions of Example 1. The yield of the resulting tetraethoxysilane based on silica was 20.0%. The reaction results are shown in Table 1.

Comparative Example 2

A tetraethoxysilane was produced in the same manner as in Example 1, except that the reaction temperature $T_1$ was adjusted to 180° C., the temperature $T_2$ in the outward pipe was adjusted to 264° C., and the temperature $T_3$ of the molecular sieve portion was adjusted to 41° C., in the reaction conditions of Example 1. The yield of the resulting tetraethoxysilane based on silica was 16.0%. The reaction results are shown in Table 1.

Comparative Example 3

A tetraethoxysilane was produced in the same manner as in Example 1, except that the reaction temperature $T_1$ was adjusted to 200° C. the temperature $T_2$ in the outward pipe was adjusted to 325° C., and the temperature $T_3$ of the molecular sieve portion was adjusted to 24° C., in the reaction conditions of Example 1. The yield of the resulting tetraethoxysilane based on silica was 34.2%. The reaction results are shown in Table 1.

Comparative Example 4

A tetraethoxysilane was produced in the same manner as in Example 1, except that the temperature $T_2$ in the outward pipe was adjusted to 360° C. and the temperature $T_3$ of the molecular sieve portion was adjusted to 151.4° C., in the reaction conditions of Example 1. The yield of the resulting tetraethoxysilane based on silica was 49.9%. The reaction results are shown in Table 1.

TABLE 1

| | T1 [° C.] | T2 [° C.] | T3 [° C.] | P [MPa] | Molecular sieve type | [g] | Alkaline metal compound/ Alkaline earth metal compound type | [g] | Alcohol | Yield [%] |
|---|---|---|---|---|---|---|---|---|---|---|
| Example 1 | 240 | 249 | 53 | 5.7 | 3A | 25 | KOH | 0.008 | EtOH | 72.5 |
| Example 2 | 240 | 231 | 52 | 5.8 | 3A | 25 | KOH | 0.008 | EtOH | 72.2 |
| Example 3 | 240 | 209 | 58 | 5.8 | 3A | 25 | KOH | 0.008 | EtOH | 66.2 |
| Example 4 | 260 | 264 | 66.1 | 8.3 | 3A | 25 | KOH | 0.008 | EtOH | 78.6 |
| Example 5 | 280 | 284 | 57.4 | 10.3 | 3A | 25 | KOH | 0.008 | EtOH | 80.7 |
| Example 6 | 240 | 249 | 53 | 5.7 | 3A | 90 | KOH | 0.16 | EtOH | 79.1 |
| Example 7 | 240 | 249 | 53 | 5.7 | 4A | 90 | KOH | 0.16 | EtOH | 55.2 |
| Example 8 | 240 | 249 | 53 | 5.7 | 3A | 90 | KF | 0.17 | EtOH | 91.7 |
| Example 9 | 240 | 249 | 53 | 5.7 | 3A | 90 | $K_2CO_3$ | 0.21 | EtOH | 79.6 |
| Example 10 | 240 | 249 | 53 | 5.7 | 3A | 90 | NaOH | 0.12 | EtOH | 72.8 |
| Example 11 | 240 | 249 | 53 | 5.7 | 3A | 90 | $Na_2CO_3$ | 0.11 | EtOH | 79.4 |
| Example 12 | 240 | 249 | 53 | 5.7 | 3A | 90 | $Cs_2CO_3$ | 0.49 | EtOH | 84.1 |
| Example 13 | 230 | 240 | 60 | 6.7 | 3A | 90 | KOH | 0.16 | MeOH | 51.0 |
| Example 14 | 210 | 210 | 60 | 1.5 | 3A | 90 | KOH | 0.16 | 1-PrOH | 78.7 |
| Reference Example 1 | 240 | 246 | 65 | 5.9 | 3A | 0 | KOH | 0.008 | EtOH | 20.6 |
| Comaparative Example 1 | 240 | 187 | 37 | 5.7 | 3A | 25 | KOH | 0.008 | EtOH | 20.0 |
| Comaparative Example 2 | 180 | 284 | 41 | 1.78 | 3A | 25 | KOH | 0.008 | EtOH | 16.0 |
| Comaparative Example 3 | 200 | 325 | 24 | 2.7 | 3A | 25 | KOH | 0.008 | EtOH | 34.2 |
| Comaparative Example 4 | 240 | 360 | 151.4 | 5.9 | 3A | 25 | KOH | 0.008 | EtOH | 49.9 |

The present application is based on Japanese Patent Application (Japanese Patent Application No. 2017-252118) filed on Dec. 27, 2017, the content of which is incorporated herein by reference.

INDUSTRIAL APPLICABILITY

The production method according to the present invention enables a highly efficient production of a tetraalkoxysilane, which is used as a raw material for producing various types of silane compounds, organic silicone polymers, various types of silylating agents, colloidal silicas, ceramics and the like.

REFERENCE SIGNS LIST

101 apparatus which can be used in the production method according to the present invention
102 alcohol
103 silicon oxide
104 vaporized component of reaction mixture
105 molecular sieve
106 reactor for carrying out the first step
107 container for carrying out the second step
108 outward flow path for allowing the vaporized component of the reaction mixture to move therethrough
109 inward flow path for allowing a component which has been brought into contact with the molecular sieve to move therethrough
110 connecting portion connecting between the container for carrying out the second step and the outward, flow path

The invention claimed is:

1. A method for producing a tetraalkoxysilane, the method comprising:
   a first step of reacting an alcohol with a silicon oxide; and
   a second step of bringing a vaporized component of the reaction mixture obtained in the first step into contact with a molecular sieve;
   wherein:
   the first step is carried out in a reactor whose temperature ($T_1$) is controlled within the range of 200° C.<$T_1$<300° C.;
   the second step is carried out in a container whose temperature ($T_3$) is controlled within the range of 10° C.≤$T_3$≤150° C., and which includes the molecular sieve provided therein;
   the vaporized component moves from the reactor to the container through an outward flow path whose temperature ($T_2$) is controlled within the range of 190° C.≤$T_2$≤300° C.; and
   a component which has been brought into contact with the molecular sieve in the second step moves from the container to the reactor through an inward flow path.

2. The method for producing a tetraalkoxysilane according to claim 1, wherein the first step is carried out in the presence of an alkali metal compound and/or an alkaline earth metal compound.

3. The method for producing a tetraalkoxysilane according to claim 2, wherein the alkali metal compound is at least one selected from the group consisting of an alkali metal hydroxide, an alkali metal halide, an alkali metal carbonate and an alkali metal bicarbonate.

4. The method for producing a tetraalkoxysilane according to claim 1, wherein the reaction mixture does not comprise a compound for carrying out an azeotropic distillation.

5. The method for producing a tetraalkoxysilane according to claim 3, wherein the alkali metal compound is at least one selected from the group consisting of lithium hydroxide, sodium hydroxide, potassium hydroxide, calcium hydroxide, cesium hydroxide, lithium carbonate, sodium carbonate, potassium carbonate, cesium carbonate, sodium fluoride, potassium fluoride and cesium fluoride.

6. The method for producing a tetraalkoxysilane according to claim 1, wherein the temperature ($T_2$) is controlled within the range of 210° C.$\leq T_2 \leq$300° C., and the temperature ($T_2$) is higher than the temperature ($T_1$).

7. The method for producing a tetraalkoxysilane according to claim 1, wherein the molecular sieve is 3A zeolite or 4A zeolite.

8. The method for producing a tetraalkoxysilane according to claim 1, wherein the alcohol is an alcohol having 1 to 10 carbon atoms.

9. The method for producing a tetraalkoxysilane according to claim 2, wherein the reaction mixture does not comprise a compound for carrying out an azeotropic distillation.

10. The method for producing a tetraalkoxysilane according to claim 2, wherein the temperature ($T_2$) is controlled within the range of 210° C.$\leq T_2 \leq$300° C., and the temperature ($T_2$) is higher than the temperature ($T_1$).

11. The method for producing a tetraalkoxysilane according to claim 2, wherein the molecular sieve is 3A zeolite or 4A zeolite.

12. The method for producing a tetraalkoxysilane according to claim 2, wherein the alcohol is an alcohol having 1 to 10 carbon atoms.

13. The method for producing a tetraalkoxysilane according to claim 3, wherein the reaction mixture does not comprise a compound for carrying out an azeotropic distillation.

14. The method for producing a tetraalkoxysilane according to claim 3, wherein the temperature ($T_2$) is controlled within the range of 210° C.$\leq T_2 \leq$300° C., and the temperature ($T_2$) is higher than the temperature ($T_1$).

15. The method for producing a tetraalkoxysilane according to claim 3, wherein the molecular sieve is 3A zeolite or 4A zeolite.

16. The method for producing a tetraalkoxysilane according to claim 3, wherein the alcohol is an alcohol having 1 to 10 carbon atoms.

17. The method for producing a tetraalkoxysilane according to claim 4, wherein the temperature ($T_2$) is controlled within the range of 210° C.$\leq T_2 \leq$300° C., and the temperature ($T_2$) is higher than the temperature ($T_1$).

18. The method for producing a tetraalkoxysilane according to claim 4, wherein the molecular sieve is 3A zeolite or 4A zeolite.

19. The method for producing a tetraalkoxysilane according to claim 4, wherein the alcohol is an alcohol having 1 to 10 carbon atoms.

\* \* \* \* \*